April 8, 1941. G. A. TINNERMAN Re. 21,769

SHEET METAL NUT

Original Filed Oct. 4, 1937

~~Filed Oct. 4, 1937~~

INVENTOR.

BY GEORGE A. TINNERMAN

Bates, Golwick & Teare

ATTORNEYS

Reissued Apr. 8, 1941

Re. 21,769

UNITED STATES PATENT OFFICE 21,769

SHEET METAL NUT

George A. Tinnerman, Cleveland, Ohio, assignor, by mesne assignments, to Tinnerman Products, Inc., Cleveland, Ohio, a corporation of Ohio Original No. 2,140,064, dated December 13, 1938, Serial No. 167,307, October 4, 1937. Application for reissue October 2, 1940, Serial No. 359,450

4 Claims. (Cl. 85—36)

This invention relates to fasteners, and particularly those which are adapted to be used in conjunction with a bolt for holding two or more articles together.

Fasteners of this type have been designed to engage only one helix of a bolt thread for the purpose of effecting an assembly. I have found, however, that a single thread engaging fastener, especially where the fastener is used to hold heavy parts in connection with automobile assemblies, will strip the bolt threads whenever the bolt is tightened to the desired degree.

An object of the present invention is to make a fastener which may be used satisfactorily for holding heavy parts together without stripping the bolt thread. In this connection the invention is directed toward a construction which may be economically made and readily attached in bolt-receiving position.

Figure 1:
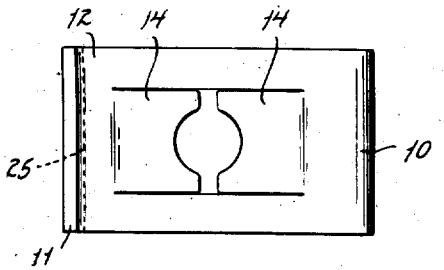
Figure 2:
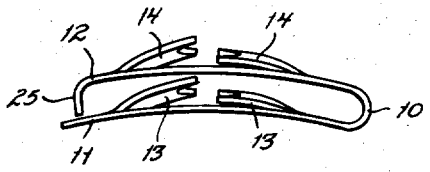
Figure 3:
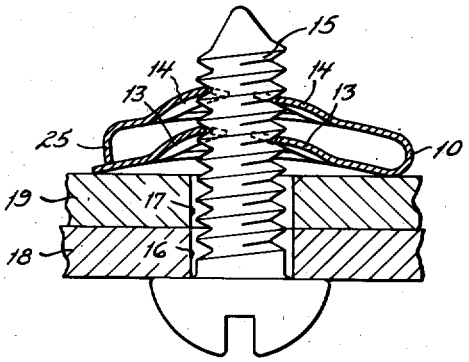
Figure 4:
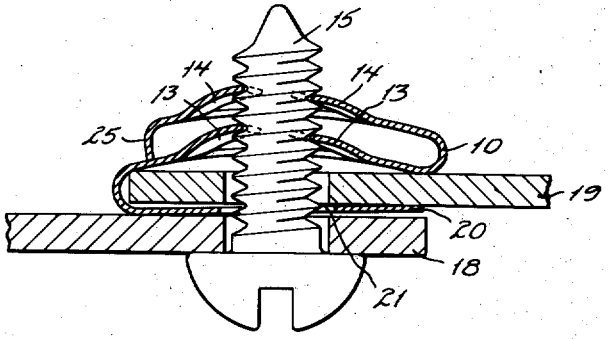

Referring now to the drawing, Fig. 1 is a top plan view of a fastener embodying my invention; Fig. 2 is a front view of the fastener, and Fig. 3 is a section taken through two articles that are held together by a bolt and a fastener, which embodies my invention; Fig. 4 is a section taken through two parts that are held together by a bolt and by a fastener, which comprises a modification of my invention.

Ordinarily a threadless fastener is adapted to engage only one turn of the bolt thread. My invention, however, embodies a fastener which engages more than one turn and accomplishes the fastening operation without threading the fastener. In Fig. 1, for example, the fastener is illustrated as comprising a strip of sheet metal having a body, which is bent intermediately at 10 to make arms 11 and 12. Each arm is preferably arched and each is provided with bolt thread engaging portions that are formed from the body and extend out of the plane thereof. In the form illustrated, the thread engaging portions preferably comprise tongues 13 on the arm 11 and tongues 14 on the arm 12 which project upwardly and which have an aperture therebetween through which the shank of a threaded member may extend. The arms are spaced sufficiently far apart that the thread engaging portions on the arm 11 engage one turn of a bolt thread while those on the arm 12 engage a different turn of the bolt thread. The relationship of the thread engaging portions to the thread is best illustrated in Fig. 3 wherein a bolt 15 is shown as extending through apertures 16 and 17 in parts 18 and 19, and also through the thread engaging portions 13 and 14 of the fastener. In this illustration, the ends of the arm 11 rest upon the part 19, wherefore both arms are moved toward the part upon tightening of the bolt.

By utilizing two yieldable arms which engage different turns of a bolt thread and by making the fastener out of the material which has a thickness less than the pitch distance of the bolt thread, I have obtained a fastener construction which has sufficient strength to withstand the extreme limit to which a bolt can be tightened. The fact is that this construction will withstand sufficient force to shear the thread of the bolt without damaging the fastener. This advantage is of major importance in production work particularly in automotive assembly work where power-screw drivers are utilized for tightening bolts.

In a modification of Fig. 4, the fastener has substantially the same U-shaped arrangement of arms that correspond to those designated at 11 and 12, and each arm has thread engaging means formed therefrom, which may be the same as those illustrated in connection with fasteners shown in Figs. 1 to 3 inclusive. In the modification, the arm 11 has an extension 20 that is bent downwardly and inwardly to provide a clip which may frictionally engage one of the parts 18 for holding the fastener in self-sustaining bolt receiving position. This extension is shown as having an aperture 21 in registration with the bolt receiving openings 16 and 17 and also in registration with bolt receiving apertures which are defined by the thread engaging portions 13 and 14 respectively. Thus, the extension cooperates with the arms to make a substantially S-shaped fastener, which not only possesses the strength of the fastener first described but possesses the added advantage of being able to engage a part frictionally and to remain therein in bolt receiving position.

To limit the movement of the upper arm with reference to the lower one, I may provide a downturned flange 25 on the end of the upper arm which when it engages the lower arm makes a satisfactory arrangement for holding the arms in proper spacing relationship for enabling the thread to be satisfactorily engaged.

While I have illustrated the thread engaging portions of the fastener, as comprising flexible tongues, I may, if desired, utilize other forms, but, in each case, it is to be understood that the thread engaging parts at their margins are shaped to conform to the helix of the thread with which they are intended to be used.

I claim:

1. A fastener comprising a one-piece sheet metal strip having a substantially S-shaped formation including three arms of substantially the same length, and having a uniform thickness throughout its length, the thickness being smaller than the pitch distance of the thread on a bolt with which the fastener is intended to be used, said arms having registering bolt-receiving apertures therein intermediate the ends thereof, one of the apertures being adapted to admit a bolt without engaging the threads thereof, and the other arms having portions formed therefrom for engaging different turns of the bolt thread, said last named arms extending in the same general direction and being adapted to be moved toward the third arm during the bolt tightening operation.

2. A fastener comprising a single strip of sheet metal having two arms that are connected along an uninterrupted surface adjacent one end, each arm extending longitudinally in the same general direction and having intermediate its ends a bolt receiving aperture, and each arm having a thread engaging portion offset therefrom, the arms being spaced apart more than the pitch distance of the thread on a bolt with which the fastener is intended to be used, and means on one of the arms for limiting its movement toward the other arm.

3. A fastener comprising a one piece sheet metal strip, the thickness of which is less than the pitch distance of the thread on a bolt with which the fastener is intended to be used, said strip comprising two arms that are connected together along an uninterrupted surface and that are disposed in superimposed spaced relationship, the upper arm having a downwardly extending tongue for engaging the lower arm and limiting movement of the upper arm toward the lower one, each arm having thread engaging portions offset therefrom and extending upwardly therefrom, said portions being in registration to provide a continuous passage for a bolt therebetween.

4. A sheet metal nut, comprising a body having a protuberance therein provided with an opening, the edge of said opening being shaped to provide a thread for a bolt, a portion formed integrally with said body and return-bent to overhang said protuberance, an opening in said portion aligned with said first-named opening, lug means depending from said portion toward said body, and means formed as a part of said body to attach said nut to the structure with which it is to be used.

GEORGE A. TINNERMAN.